United States Patent
Oh et al.

(10) Patent No.: US 10,811,665 B2
(45) Date of Patent: Oct. 20, 2020

(54) ELECTRODE ASSEMBLY HAVING INDENTED PORTION FORMED ON ELECTRODE PLATE, AND SECONDARY BATTERY INCLUDING SAME

(71) Applicant: LG Chem, Ltd., Seoul (KR)

(72) Inventors: Sei Woon Oh, Daejeon (KR); Hyun Min Kim, Daejeon (KR); Eun Ju Lee, Daejeon (KR); Sun Hwak Woo, Daejeon (KR)

(73) Assignee: LG Chem, Ltd. (KR)

( * ) Notice: Subject to any disclaimer, the term of this patent is extended or adjusted under 35 U.S.C. 154(b) by 118 days.

(21) Appl. No.: 15/762,342

(22) PCT Filed: Oct. 18, 2016

(86) PCT No.: PCT/KR2016/011696
§ 371 (c)(1),
(2) Date: Mar. 22, 2018

(87) PCT Pub. No.: WO2017/104956
PCT Pub. Date: Jun. 22, 2017

(65) Prior Publication Data
US 2018/0269458 A1 Sep. 20, 2018

(30) Foreign Application Priority Data

Dec. 14, 2015 (KR) .................. 10-2015-0177861

(51) Int. Cl.
*H01M 2/26* (2006.01)
*H01M 10/04* (2006.01)
(Continued)

(52) U.S. Cl.
CPC .............. *H01M 2/26* (2013.01); *H01M 2/02* (2013.01); *H01M 2/0202* (2013.01);
(Continued)

(58) Field of Classification Search
CPC .............. H01M 2/26; H01M 10/0585; H01M 10/0525; H01M 4/13; H01M 2/08;
(Continued)

(56) References Cited

U.S. PATENT DOCUMENTS

| 2010/0055558 A1 | 3/2010 | Choi et al. |
| 2011/0274955 A1 | 11/2011 | Park et al. |

(Continued)

FOREIGN PATENT DOCUMENTS

| CN | 1906779 A | 1/2007 |
| CN | 101454925 A | 6/2009 |

(Continued)

OTHER PUBLICATIONS

International Search Report for Application No. PCT/KR2016/011696 dated Jan. 23, 2017.

(Continued)

*Primary Examiner* — Haroon S. Sheikh
*Assistant Examiner* — Alex Rae
(74) *Attorney, Agent, or Firm* — Lerner, David, Littenberg, Krumholz & Mentlik, LLP (57) ABSTRACT

The present invention relates to an electrode assembly including at least two electrode plates and a separator interposed between the electrode plates, wherein indented portions are formed from lower ends of opposite sides of the electrode tab in an opposite direction to an externally extending direction of the electrode tab in a side of the electrode body in which the electrode tab externally extends, in the electrode plates.

20 Claims, 5 Drawing Sheets

(51) Int. Cl.
*H01M 2/10* (2006.01)
*H01M 2/02* (2006.01)
*H01M 2/08* (2006.01)
*H01M 4/13* (2010.01)
*H01M 10/0525* (2010.01)
*H01M 10/0583* (2010.01)
*H01M 10/0585* (2010.01)

(52) U.S. Cl.
CPC ......... *H01M 2/028* (2013.01); *H01M 2/0287* (2013.01); *H01M 2/08* (2013.01); *H01M 2/10* (2013.01); *H01M 4/13* (2013.01); *H01M 10/04* (2013.01); *H01M 10/0525* (2013.01); *H01M 10/0583* (2013.01); *H01M 10/0585* (2013.01); *H01M 2220/30* (2013.01)

(58) Field of Classification Search
CPC .. H01M 2/0287; H01M 2/028; H01M 2/0202; H01M 10/04; H01M 2/10; H01M 2/02; H01M 2220/30
See application file for complete search history.

(56) References Cited

U.S. PATENT DOCUMENTS

| | | | | |
|---|---|---|---|---|
| 2012/0196172 A1* | 8/2012 | Maeda | ................ | H01M 2/1673 429/139 |
| 2013/0011722 A1* | 1/2013 | Ahn | ........................ | H01M 2/06 429/179 |
| 2013/0252053 A1* | 9/2013 | Woo | ........................ | H01M 2/26 429/94 |
| 2014/0170467 A1 | 6/2014 | Kwon et al. | | |
| 2014/0193710 A1* | 7/2014 | Hasegawa | ................ | H01M 2/26 429/211 |
| 2015/0037664 A1 | 2/2015 | Kang et al. | | |

FOREIGN PATENT DOCUMENTS

| | | | |
|---|---|---|---|
| JP | S5151432 U | | 4/1976 |
| JP | H07226197 A | | 8/1995 |
| JP | 2005038613 A | | 2/2005 |
| JP | 2007265738 A | | 10/2007 |
| JP | 2012178326 A | | 9/2012 |
| JP | 2013073757 A | * | 4/2013 |
| JP | 2013073757 A | | 4/2013 |
| JP | 2013187077 A | | 9/2013 |
| KR | 20010095530 A | | 11/2001 |
| KR | 20070099430 A | | 10/2007 |
| KR | 20080109948 A | | 12/2008 |
| KR | 20110105737 A | | 9/2011 |
| KR | 101403388 B1 | | 6/2014 |
| KR | 20140077622 A | | 6/2014 |

OTHER PUBLICATIONS

Extended European Search Report including Written Opinion for Application No. EP16875898.5 dated Sep. 26, 2018.

* cited by examiner

Prior Art

ELECTRODE ASSEMBLY HAVING INDENTED PORTION FORMED ON ELECTRODE PLATE, AND SECONDARY BATTERY INCLUDING SAME

CROSS-REFERENCE TO RELATED APPLICATIONS

This application is a national phase entry under 35 U.S.C. § 371 of International Application No. PCT/KR2016/011696 filed Oct. 18, 2016, which claims priority to Korean Patent Application No. 10-2015-0177861, filed Dec. 14, 2015, the disclosures of which are incorporated herein by reference.

TECHNICAL FIELD

The present invention relates to an electrode assembly and a secondary battery including the same, and more particularly, to an electrode assembly including an electrode tab that outwardly extends from an electrode plate, and having an indented portion formed in an opposite direction to an extending direction of an electrode tab from lower ends of opposite sides of the electrode tab.

BACKGROUND

Demands for mobile devices have increased, and demands for rechargeable batteries as an alternative energy source to fossil fuels have increased sharply. Among such rechargeable batteries, a lithium secondary battery has a high energy density and discharge voltage, and many studies have been made on them and they have been commercialized and widely used.

In general, the lithium secondary battery is formed by mounting an electrode assembly formed to include a positive electrode, a negative electrode, and a separator interposed therebetween, which is stacked or wrapped in a battery case of a metal can or a laminate sheet, and then injecting or impregnating an electrolyte solution.

In recent years, enlargement of a case and processing with a thin material have attracted much attention due to a high capacity of the batteries. Accordingly, a pouch-shaped battery having a structure in which a stacked or stacked/folded electrode assembly is embedded in a pouch-shaped battery case made of an aluminum laminate sheet been gradually increased in usage due to low manufacturing cost, low weight, and easy deformation.

Figure 1:
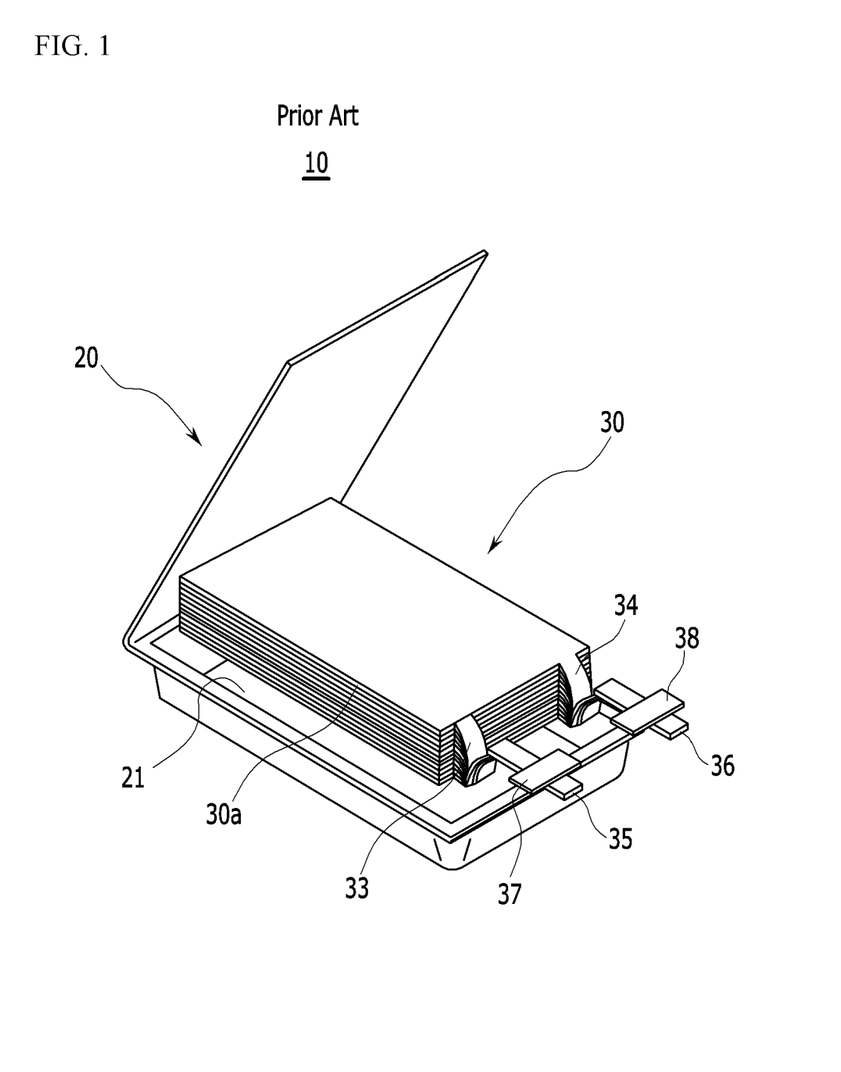
FIG. 1 is a schematic exploded perspective view illustrating a general structure of a typical conventional pouch-shaped secondary battery.

FIG. 1 is a schematic exploded perspective view illustrating a general structure of a typical conventional pouch-shaped secondary battery.

Referring to FIG. 1, the pouch-shaped secondary battery 10 includes a battery case 20 and an electrode assembly 30 accommodated in a storage portion 21 of the battery case in a state of being impregnated with an electrolyte solution.

The electrode assembly 30 is a power generation device in which a positive electrode plate and a negative electrode plate such as an electrode plate 30a are sequentially stacked with a separator interposed therebetween, to have a stacked structure, a stacked/folded structure, or a laminated/stacked structure. Electrode tabs 33 and 34 extend from each of the electrode plates of the electrode assembly 30, and electrode leads 35 and 36 electrically connected by, e.g., welding to the electrode tabs 33 and 34 extended from each electrode plate, and are partially exposed to an outside of the battery case 20. In addition, lead films 37 and 38 for improving sealing with the battery case 20 and ensuring an electrically insulated state are attached to portions of upper and lower surfaces of the electrode leads 35 and 36.

The battery case 20 is formed of an aluminum-laminated sheet, provides a space defining a storage portion 21 for accommodating the electrode assembly 30, and has a generally pouch-like shape.

The electrode plates constituting the electrode assembly 30 are generally manufactured by applying an electrode mixture containing an electrode active material to a metal collector and then drying and rolling it to increase the rigidity and density thereof.

Figure 2:
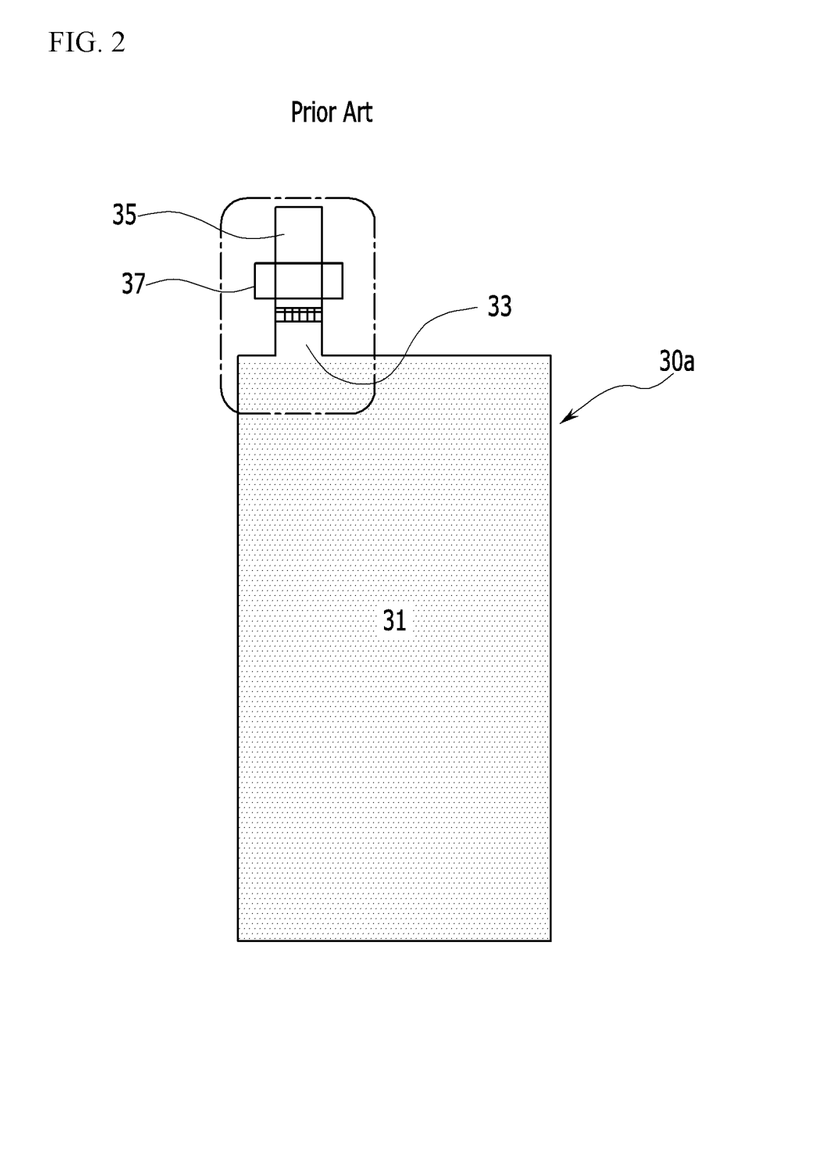
FIG. 2 schematically illustrates a top plan view of an electrode plate 30a constituting the electrode assembly of FIG. 1.

FIG. 2 schematically illustrates a top plan view of an electrode plate 30a constituting the electrode assembly of FIG. 1.

The electrode plate 30a includes an electrode body 31 and an electrode tab 33 extended from a side thereof, and the electrode body 31 is coated with an electrode mixture containing an electrode active material except at an upper end thereof.

The electrode tab 33 may be connected with the electrode lead 35 by welding or the like, and an electrode plate may include an uncoated region to which a mixture is not applied in order to secure a connection space therebetween. The uncoated region at which a collector is exposed may be a thin metal foil, which is vulnerable to physical impact, and breakage and damage may occur particularly during hot rolling of the electrode material mixture.

In addition, as an area of the uncoated region increases, an amount of an active material accommodated by the electrode plate relatively decreases, and thus a volume of the uncoated region increases relative to a capacity thereof.

Therefore, there is a high need for a technique capable of solving these problems at once.

Technical Problem

The present invention has been made in an effort to solve the above-mentioned problems of the prior art and the technical problems from the past.

Specifically, the present invention has been made in an effort to provide an electrode assembly capable of securing a coupling space between an electrode tab and an electrode lead by forming an indented portion at lower ends of opposite sides thereof from which the electrode tab extends, and improving stability and usability of a rolling process by reducing an area of an uncoated region.

The present invention has also been made in an effort to provide a secondary battery including the electrode assembly, with increased capacity compared with volume.

Technical Solution

An exemplary embodiment of the present invention provides an electrode assembly including at least two electrode plates and a separator interposed between the electrode plates, wherein each of the electrode plates includes: an electrode body including a collector having one surface or opposite surfaces to which an electrode mixture containing an electrode active material is applied, and at least one electrode tab extended externally from a side of the electrode body and including a collector to which an electrode mixture is not applied; and indented portions that are formed from lower ends of opposite sides of the at least one electrode tab in an opposite direction to an externally extending direction of the at least one electrode tab in a side of the electrode body in which the electrode tab externally extends, and the at least one electrode tab of the electrode plates is coupled to an electrode lead.

Specifically, according to an exemplary embodiment, the electrode assembly includes the electrode plate in which the indented portions are formed at the lower ends of the opposite sides of the electrode tab in an opposite direction to the externally extending direction of the electrode tab, to reduce an uncoated region necessary for welding, thereby providing a secondary battery with increased capacity relative to volume thereof.

In a stacked electrode assembly, a stacked body in which an electrode plate and a separator are alternately stacked has a different thickness from that of electrode leads connected with an electrode body extending outward from the electrode body.

For example, when the stacked body of the separator and the electrode plate has a thickness of 10 mm and the electrode lead has a thickness of 0.2 mm, the electrode tab positioned on a same plane as the electrode lead does not need to be bent. As a distance therefrom increases, a bending angle of the electrode tab increases due to the difference in thickness, and a high stress acts thereon. Accordingly, the electrode tab needs to have a predetermined length, and an electrode tab positioned farther from the electrode lead is required to have a longer electrode tab.

An electrode mixture is not applied to the electrode tab, and for the same reason as described above, the conventional electrode plate has to secure a predetermined range of uncoated portion including the electrode tab.

Accordingly, as the electrode assembly according to the exemplary embodiment of the present invention reduces the area of the uncoated region including the electrode tab by introducing the indented portion at the lower ends of the opposite sides of the electrode tab, the bending angle and the stress of the collector are alleviated, and even when rolled, they are not broken to improve the processability.

Specifically, the electrode plates may include a positive electrode plate and a negative electrode plate, and an area of the negative electrode plate may be relatively larger than that of the positive electrode plate.

In this case, an area of the indented portion formed in the negative electrode plate may be relatively larger than that of the indented portion formed in the positive electrode plate.

The indented portions formed in the positive electrode plate and the negative electrode plate may have shapes corresponding to each other, such that they may have a symmetrical structure with respect to a central line crossing the positive electrode tab and the negative electrode tab.

Specifically, in the case where the positive electrode tab and the negative electrode tab are formed in one direction and the negative electrode plate that is larger than the relatively small positive electrode plate is protruded in the one side direction in which the electrode tab of the electrode body is formed, an area of the indented portion of the negative electrode tab may be wider than that of the positive electrode tab.

Each of the indented portions may have at least one shape of a polygon, a semi-circle, a semi-ellipse, and a polygon having at least one curved side in a plan view.

Specifically, each external circumferential side of the indented portions may include a semicircular curved portion and one or two straight portions extended from the curved portion.

The straight portions have substantially a same function as the electrode tab protruding outwardly in the form of a conventional electrode plate. As the length of the straight portion increases, a stress relieving portion increases, so that the straight portion of the indented portion increases as the electrode plate farther from the electrode lead increases.

The curved portion minimizes the stress and prevents the electrode plate from breaking. When the external circumferential side of the indented portion includes no curved portion and is formed simply by a straight line, a weak point may be formed, which is not preferable.

In this case, the curved portion may have a radius that is in a range of 1 mm to 6 mm.

When the radius of the curved portion is out of the above range and the radius of the curved portion is more than 6 mm, the width of the indented portion may be too large because of the diameter of 12 mm. When the radius is less than 1 mm, it is difficult to form the curved portion.

The shape of the curved portion is not particularly limited as long as it does not have a vertex, and the curvature at all points does not necessarily have to be equal to the radius.

Each length of the straight portions may be in a range of 0 mm to 5 mm, exclusive.

As described above, the longer the length of the straight portions, the greater the area for relieving the stress, and substantially the same effect as the increase in the length of the electrode tab is provided.

Therefore, the electrode assembly may have a structure in which the straight portion of the indented portion gradually increases as the electrode plate is more distant from the electrode lead However, even in this case, the length of the straight portion preferably satisfies the above range, and when the length of the straight portion is too long when beyond the above range, breakage may occur in the electrode mixture layer. Particularly, when it exceeds 50% of the length of the electrode plate, the electrode plate may be separated, which is not preferable.

The straight portion need not always be included. In this case, the length of the straight portion is 0 mm, and the indented portion has a semicircular or semi-elliptic shape.

As such, each area of the indented portions may be in a range of 10.0 mm$^2$ to 40.0 mm$^2$, exclusive. Specifically, it may be in a range of 15.0 mm$^2$ to 30.0 mm$^2$, exclusive, but may be variously applied depending on the use and shape of the secondary battery, and is not particularly limited.

The indented portions may be symmetrical or asymmetrical with respect to the electrode tab. For example, they may have symmetrical shapes.

Such an indented portion may be formed by punching an electrode plate. The punching process may be performed in the process of preparing the collector, but may be performed after the electrode mixture is applied and after the rolling and drying process.

A length of the electrode tab may be in a range of 2.0 mm to 10.0 mm, exclusive.

A connection process of the electrode tabs and the electrode leads is carried out by welding, in particular by ultrasonic welding, with a width of at least 2.0 mm so that a welding horn contacts it and maintains the bonding force. For example, when the length of the electrode tab is less than 2.0 mm, bonding with the electrode lead is difficult, which is not preferable.

In addition, since it is difficult to carry out welding at an end portion of the electrode tab, the electrode tab may have a margin of about 1.0 mm or more, or 3.0 mm or more.

As described above, the electrode tab corresponds to an uncoated portion to which the electrode mixture is not applied, and the uncoated portion may be determined within a range that does not cause cracking in the electrode mixture layer and does not cause fracture in the course of welding or the like in the electrode assembly according to the exemplary embodiment of the present invention.

Therefore, the non-coated portion including the electrode tab is not necessarily based on one side of the electrode body or the innermost side of the indented portion, and may be determined in consideration of suitability of welding, stability, and the like.

An area of the separator interposed in stacked bodies of a positive electrode plate and a negative electrode plate may be larger than those of the electrode plates so as to ensure insulation between the electrode plates.

Specifically, the area of the separator may have a relatively larger area than a sum of areas of the indented portion and the electrode body, and an accommodating portion for accommodating the electrode plate-separator stacked body is generally formed to have an area as large as about 0.5 mm in width and length.

The electrode assembly may be a stacked, stacked/folded, or laminated/stacked electrode assembly.

Specifically, according to the exemplary embodiment of the present invention, the indented portion may be suitably used for a stacked structure of the electrode assembly, although it is not particularly limited as long as an electrode tab group extending outwardly is collected and connected to the electrode lead so that stress can be applied.

The stacked electrode assembly has a structure in which a plurality of positive and negative electrodes cut in a predetermined unit are sequentially stacked with a separator interposed therebetween, the stacked/folded electrode assembly has a structure in which unit cells in which a predetermined unit of positive and negative electrodes are stacked with a separator interposed therebetween are sequentially wound on a separating film, and the laminated/stacked electrode assembly has a structure in which laminated electrode plate-separating film units are sequentially laminated.

The present invention also provides a secondary battery, wherein the electrode assembly is embedded in a battery case in an electrolyte-impregnated state, and one end portions of the positive electrode lead and the negative electrode lead protrude to the outside of the battery case.

A welded portion may be formed at a joint portion between the positive electrode tabs and the positive electrode lead, and at a joint portion between the negative electrode tab and the negative electrode lead.

As a result, the connection method of the electrode tabs and the electrode lead is not particularly limited, but may be performed by welding, and such a welded portion requires an area spaced apart from about 2.0 mm to 5.0 mm.

The battery case may include a concave-shaped accommodating portion for accommodating the electrode assembly and a sealing portion formed in an external circumferential surface of the accommodating portion to secure a sealing property of the battery case, and the sealing portion may be positioned at an upper side portion of a welded portion between electrode tabs and an electrode lead.

In addition, a side of the accommodating portion may be positioned at a lower end portion of the welded portion between the electrode tabs and electrode lead.

As a result, according to the exemplary embodiment of the present invention, the secondary battery may reduce a length of a so-called terrace portion in which the electrode tabs and the electrode lead are interposed in the battery case by configuring a distance between the sealing portion and the accommodating portion in the battery case to be substantially coincident with the weld portion.

According to the exemplary embodiment, the positive electrode lead and the negative electrode lead may be respectively positioned on same planes as one positive electrode plate and one negative electrode plate, and a portion of an imaginary line connecting innermost sides of the indented portions at both sides may be bent at a gradually increasing angle as a distance from the positive electrode plate and the negative electrode plate which are positioned on the same planes as the positive electrode lead and the negative electrode lead.

The electrode plate included in the conventional electrode assembly is bent at a portion where the electrode body and the electrode tabs are in contact with each other to alleviate the stress, but the electrode assembly according to the exemplary embodiment of the present invention reduces an unnecessary area by moving the bent portion to the inside of the electrode body.

In addition, when the electrode tabs are directly collected from the electrode leads, as described above, the more the position of the electrode plate is away from the electrode lead, the larger the stress acts and the bending angle gradually increases. In the case where a collecting point is separately formed before being connected to the electrode lead as illustrated in FIG. 1, a bending angle of the imaginary line gradually increases as a distance from the collecting point increases.

The battery case may be formed of a laminated sheet including a resin layer and a metal layer. In addition, although not particularly limited, the secondary battery according to the exemplary embodiment of the present invention may be applied to a pouch-shaped battery.

The present invention provides a battery pack including at least one secondary battery as a unit battery and a device including the battery pack as a power source.

Advantageous Effects

The battery pack may be used not only for a battery cell used as a power source of a small device, but also as a unit cell in a middle- or large-sized battery module including a plurality of battery cells used as a power source of a middle- or large-sized device.

As a result, according to the exemplary embodiment of the present invention, the battery pack may be applied not only to a small device such as a laptop, a smartphone, and a wearable electronic device, but also to a large device such as a two-wheeled vehicle including a power tool, an E-bike and an E-scooter powered by an electric motor, an electric golf cart, or an energy storage system, but the present invention is not limited thereto.

DETAILED DESCRIPTION OF THE EMBODIMENTS

Hereinafter, exemplary embodiments of the present invention will be described with reference to the drawings. However, the present invention is not limited by the scope of the present invention.

Figure 3:
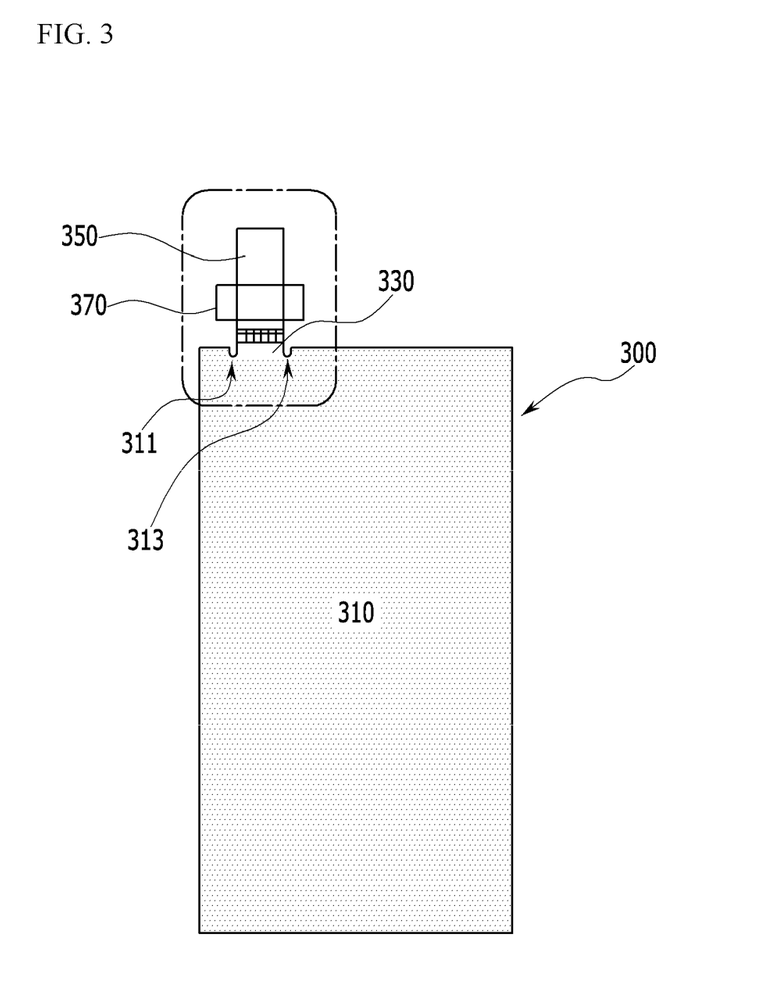
FIG. 3 is a top plan view schematically illustrating a structure of an electrode plate as a part of an electrode assembly according to an exemplary embodiment of the present invention.

FIG. 3 is a top plan view schematically illustrating a structure of an electrode plate as a part of an electrode assembly according to an exemplary embodiment of the present invention.

Referring to FIG. 3, the electrode plate 300 includes a rectangular electrode body 310 and an electrode tab 330.

The electrode tab 330 extending outward from one side of an electrode body and not coated with an electrode mixture is connected to the rectangular electrode body 310 to which the electrode mixture is applied on the current collector.

Semicircular indented portions 311 and 313 are formed on opposite lower sides of the electrode tab 330. A support portion to which the electrode mixture is applied corresponds to an entire surface of the electrode plate except for the electrode tab 330 from an imaginary line connecting innermost sides of the indented portions 311 and 313 in the electrode body 310.

The electrode tab 330 is connected to an electrode lead 350 through a welded portion, and the electrode lead 350 welded to electrode tabs of other electrode plates is then interposed between sealing portions of a battery case to expose a portion thereof. A lead film 370 is attached thereto to improve a sealing property and an insulation property.

Comparing the electrode plate 30*a* of FIG. 2 according to the conventional art with the electrode plate 300 of FIG. 3 according to the exemplary embodiment of the present invention, it is seen that an area of the support portion of the entire area of the electrode plate is increased in the electrode plate 300 as compared with the electrode plate 30*a*.

In one detailed example, in the case of a pouch-shaped battery cell (secondary battery) having a width of 90 mm and a length of 260 mm, it is seen that a capacity of the battery cell according to the exemplary embodiment of the present invention is increased by 2.5% or more as compared with the conventional battery cell, and a capacity-increasing effect is further increased as sizes of the indented portions 311 and 313 are smaller.

Figure 4:
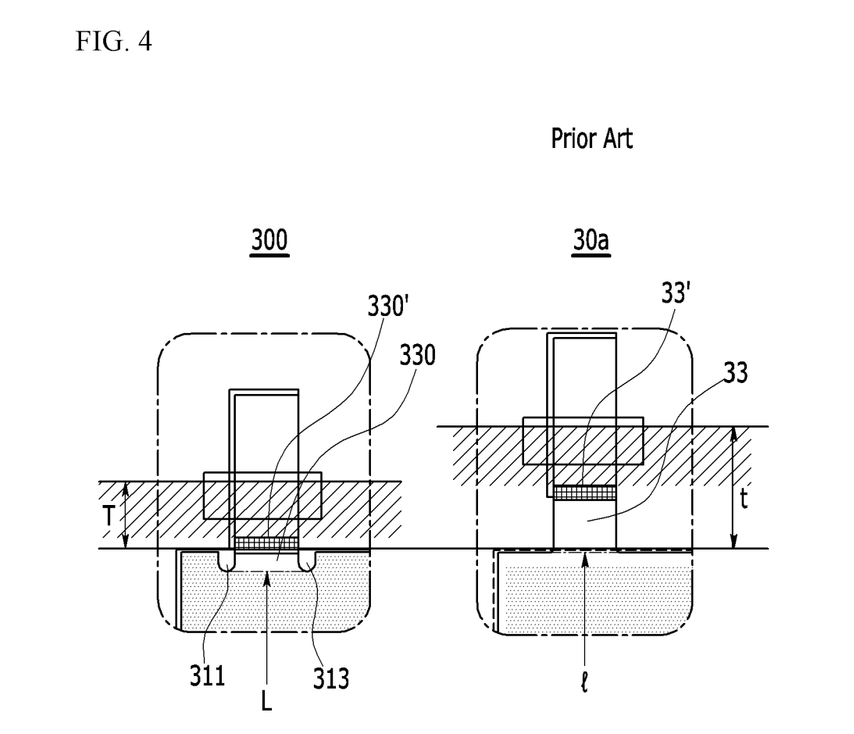
FIG. 4 is an enlarged top plan view schematically illustrating an electrode tab portion of FIG. 2 and an electrode tab portion of FIG. 3.

This will be described in more detail with reference to FIG. 4 illustrating enlarged views of an electrode tab portion indicated by a chain double-dashed line in FIG. 2 and an electrode tab portion indicated by a chain double-dashed line in FIG. 3.

Referring to FIG. 4, a left side illustrates an electrode plate of the electrode assembly according to an exemplary embodiment of the present invention, i.e., an enlarged view of the electrode plate 300 illustrated in FIG. 3, and a right side illustrates a typical conventional electrode plate of the electrode assembly, i.e., an enlarged view of the electrode plate 30*a* illustrated in FIG. 2.

The indented portions 311 and 313 are formed at a lower side of an electrode tab of the electrode plate 300, and an electrode mixture is applied up to an imaginary line L connecting the indented portion 311 and the indented portion 313. Accordingly, an area of the support portion is wider than that of the conventional electrode plate 30*a* having an upper portion to which the electrode mixture is not applied.

The electrode tab 300 of the electrode plate 330 is bent at the imaginary line L to relieve the stress, and the electrode tab 33 of the electrode plate 30*a* is bent at an imaginary line I to relieve the stress. Accordingly, the bent portions of the tabs are positioned relatively inside the electrode body in the electrode assembly according to the exemplary embodiment of the present invention.

The bent electrode tabs 33 and 330 are respectively welded and electrically connected to the electrode leads at welded portions 33' and 330'. In this case, the welded portion 330' included in the electrode plate 300 is positioned below the welded portion 33' included in the electrode plate 30*a*.

In FIG. 4, an external circumferential side of an accommodating portion of the battery case is indicated by a broken line (---), and a sealing portion is indicated by a slash (/////). An upper end portion of the welded portion 330' is in contact with a lower side of the sealing portion, and a lower end portion of the welded portion 330' is in contact with an upper side of the accommodating portion indicated by the broken line.

In contrast, an upper side portion of the welded portion 33' is in contact with a lower end of the sealing portion indicated by the slash, but the lower end portion of the welded portion 33' is spaced apart from the accommodating portion indicated by the broken line at a predetermined distance.

Accordingly, a height T of a terrace portion of the battery case of the secondary battery using the electrode plate 300 is smaller than a height t of a terrace portion of the secondary battery using the electrode plate 30*a*.

The welded portion may have a height that is in a range of at least 2.0 mm to 5.0 mm. In one detailed example, a length obtained by subtracting the height of the sealing portion (/////) from the height t of the conventional terrace portion is 9.5 mm, but a length obtained by subtracting the height of the sealing portion (/////) from the height T of the terrace portion may be reduced to about 4.5 mm.

In this case, a pouch-shaped battery cell (secondary battery) having a width of 90 mm and a length of 260 mm is relatively increased in volume of the accommodating portion to generally increase the capacity by 2.5%.

As such, the capacity-increasing effect caused by the decrease in the uncoated region may be further increased as the size of the indented portion gets smaller. In one detailed example, an external circumferential side of the indented portion may include a semicircular curved portion and two straight portions extended from the semicircle in a plan view.

Figure 5:
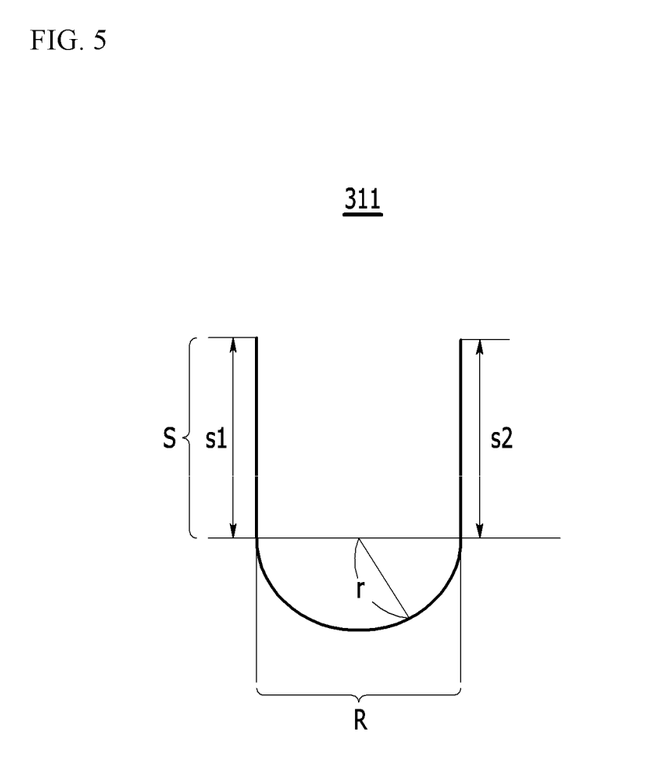
FIG. 5 is an enlarged top plan view schematically illustrating a structure of an indented portion 311 of FIG. 4.

FIG. 5 is an enlarged top plan view schematically illustrating a structure of the indented portion 311 of FIG. 4, and a shape and a size of the indented portion will be described in more detail with reference to FIG. 5.

Referring to FIG. 5, an external circumferential side of the indented portion 311 may include two straight portions S and a curved portion R, and lengths s1 and s2 of the straight portions may be in a range of 0 mm to 5 mm.

The curved portion R may have a semicircular shape, and may have a radius that is in a range of 1 mm to 6 mm, exclusive.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, the electrode assembly according to the exemplary embodiments of the present invention includes the indented portion formed in the opposite direction to the extending direction of the electrode tab from the lower ends of the opposite sides of the electrode tab, to reduce the area of the uncoated region, so that it is possible to prevent breakage of the collector during rolling and to increase the capacity.

In addition, the indented portion reduces the length of the terrace portion by moving the bent portion of the electrode tab to the inside of the electrode body and reduces the distance between the accommodating portion and the sealing portion, thereby providing a compact secondary battery.

The invention claimed is:

1. An electrode assembly comprising
at least two electrode plates and a separator interposed between the electrode plates,
wherein each of the electrode plates includes:
a planar electrode body including a collector having one surface or opposite surfaces to which an electrode mixture containing an electrode active material is applied, the electrode body having a first indented portion and a second indented portion extending into the electrode body from a first edge of the electrode body to a respective first and second terminal end, the first edge defining an edge line that extends therealong, and
at least one electrode tab extending from the electrode body from an imaginary line connecting the first and second terminal ends of the respective first and second indented portions, the electrode tab extending away from the electrode body so as to be positioned between the first and second indented portions, the electrode tab including a portion of the collector to which an electrode mixture is not applied;
wherein the at least one electrode tab of each of the electrode plates is coupled to a respective electrode lead;
wherein a respective edge zone extends along both the electrode body and the electrode tab of each of the electrode plates in a region spanning between the respective edge line and the respective imaginary line; and
wherein the electrode mixture is applied to the collector of the respective electrode body in the edge zone, and an electrode mixture is not applied to the portion of the collector of the respective electrode tab in the edge zone.

2. The electrode assembly of claim 1, wherein the electrode plates include a positive electrode plate and a negative electrode plate, and an area of the negative electrode plate is larger than that of the positive electrode plate.

3. The electrode assembly of claim 2, wherein an area of the indented portions formed in the negative electrode plate is larger than that of the indented portions formed in the positive electrode plate.

4. The electrode assembly of claim 2, wherein indented portions formed in the positive electrode plate and the negative electrode plate have shapes corresponding to each other.

5. The electrode assembly of claim 1, wherein each of the indented portions has a portion having a shape selected from the group consisting of a polygon, a semi-circle, a semi-ellipse, and a polygonal shape in which at least one straight line segment has been replaced with a curved line segment.

6. The electrode assembly of claim 1, wherein each external circumferential side of the indented portions includes a semicircular curved portion and one or two straight portions extended from the curved portion.

7. The electrode assembly of claim 6, wherein the curved portion has a radius that is in a range of 1 mm to 6 mm.

8. The electrode assembly of claim 6, wherein each length of the straight portions is in a range of 0 mm to 5 mm, exclusive.

9. The electrode assembly of claim 1, wherein each area of the indented portions is in a range of 10.0 mm$^2$ to 40.0 mm$^2$, exclusive.

10. The electrode assembly of claim 1, wherein the indented portions are symmetrical with respect to the electrode tab.

11. The electrode assembly of claim 1, wherein a length of the electrode tab is in a range of 2.0 mm to 10.0 mm, exclusive.

12. The electrode assembly of claim 1, wherein the electrode assembly is a stacked, stacked/folded, or laminated/stacked electrode assembly.

13. A secondary battery, comprising:
the electrode assembly of claim 1 embedded in a battery case impregnated with an electrolytic solution, wherein an end portion of each of a positive electrode lead and a negative electrode lead protrude to an outside of the battery case.

14. The secondary battery of claim 13, wherein a welded portion is formed at a coupling part between the positive electrode tabs and the positive electrode lead and between the negative electrode tabs and the negative electrode lead.

15. The secondary battery of claim 13, wherein the battery case includes a concave-shaped accommodating portion for accommodating the electrode assembly and a sealing portion formed in an external circumferential surface of the accommodating portion to secure a sealing property of the battery case, and the sealing portion is positioned at an upper side portion of a welded portion between electrode tabs and an electrode lead.

16. The secondary battery of claim 15, wherein a side of the accommodating portion is positioned at a lower end portion of the welded portion between the electrode tabs and the electrode lead.

17. The secondary battery of claim 13, wherein the positive electrode lead and the negative electrode lead are respectively positioned on same planes as one positive electrode plate and one negative electrode plate, and
a portion of the imaginary line is bent at a gradually increasing angle as a distance from the positive electrode plate and the negative electrode plate which are positioned on the same planes as the positive electrode lead and the negative electrode lead.

18. The secondary battery of claim 16, wherein a lead film is attached to each of the positive electrode lead and the negative electrode lead, and the lead film is interposed in the sealing portion.

19. The secondary battery of claim 13, wherein the battery case is formed of a laminated sheet including a resin layer and a metal layer.

20. A battery pack comprising at least one secondary battery of claim 13 as a unit battery.

* * * * *